(12) United States Patent
Bentmar et al.

(10) Patent No.: US 8,664,601 B2
(45) Date of Patent: Mar. 4, 2014

(54) SYSTEM AND METHOD FOR MEASURING THE THICKNESS OF A LAYER OF COATING

(75) Inventors: Mats Bentmar, Svedala (SE); Leif Cronvall, Kivik (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 5 days.

(21) Appl. No.: 13/263,000

(22) PCT Filed: Apr. 16, 2009

(86) PCT No.: PCT/SE2009/000190
§ 371 (c)(1),
(2), (4) Date: Oct. 5, 2011

(87) PCT Pub. No.: WO2010/120214
PCT Pub. Date: Oct. 21, 2010

(65) Prior Publication Data
US 2012/0033200 A1  Feb. 9, 2012

(51) Int. Cl.
*G01J 5/00* (2006.01)
*G01N 15/06* (2006.01)
*G01J 3/00* (2006.01)

(52) U.S. Cl.
USPC ............................ 250/338.1; 250/573; 356/51

(58) Field of Classification Search
USPC ............... 250/338.1, 583, 573, 577; 702/170; 356/51, 630, 485
See application file for complete search history.

(56) References Cited

U.S. PATENT DOCUMENTS

| 4,182,259 A | 1/1980 | Garner et al. | |
|---|---|---|---|
| 5,496,407 A * | 3/1996 | McAleavey | 118/677 |
| 6,179,918 B1 | 1/2001 | Belotserkovsky | |
| 6,470,294 B1 | 10/2002 | Taylor | |
| 6,805,899 B2 | 10/2004 | MacHattie et al. | |
| 2002/0131058 A1 | 9/2002 | Luxem | |
| 2004/0003739 A1 | 1/2004 | Leif | |

FOREIGN PATENT DOCUMENTS

| EP | 0472872 A2 | 3/1992 |
|---|---|---|
| JP | S55-50106 A | 4/1980 |
| JP | S59-7923 B2 | 2/1984 |
| JP | 63-24119 A | 2/1988 |
| JP | 63-242375 A | 10/1988 |
| JP | S63-242376 A | 10/1988 |

(Continued)

OTHER PUBLICATIONS

*International Search Report (PCT/ISA/210) issued on Dec. 14, 2009, by Swedish Patent Office as the International Searching Authority for International Application No. PCT/SE2009/000190.

(Continued)

*Primary Examiner* — David Porta
*Assistant Examiner* — Faye Boosalis
(74) *Attorney, Agent, or Firm* — Buchanan Ingersoll & Rooney PC

(57) ABSTRACT

A system and a method for measuring the thickness of a layer of coating deposited on a substrate indirectly measures the thickness of the layer of coating on the substrate by measuring the thickness of layers of coating on a coating roller before and after the coating is transferred from the coating roller to the substrate. To measure the thickness of the layers of coating on the coating roller two sensors are used directed to respective layer on the coating roller. The sensors have IR radiators and IR detectors.

20 Claims, 2 Drawing Sheets

(56) References Cited

FOREIGN PATENT DOCUMENTS

| | | |
|---|---|---|
| JP | H04-233405 A | 8/1992 |
| JP | H07-114999 B2 | 12/1995 |
| JP | H07-115000 B2 | 12/1995 |
| JP | 2002-530664 A | 9/2002 |
| JP | 2002-350125 A | 12/2002 |
| JP | 2003-004419 A | 1/2003 |
| JP | 2003-194526 A | 7/2003 |
| JP | 2004-502607 A | 1/2004 |
| JP | 2004-513813 A | 5/2004 |
| JP | 2005-516202 A | 6/2005 |
| WO | WO 02/42077 A1 | 5/2002 |

OTHER PUBLICATIONS

Japanese Office Action dated Jun. 14, 2013 issued in the corresponding Japanese Patent Application No. 2012-505848 and English language translation.

* cited by examiner

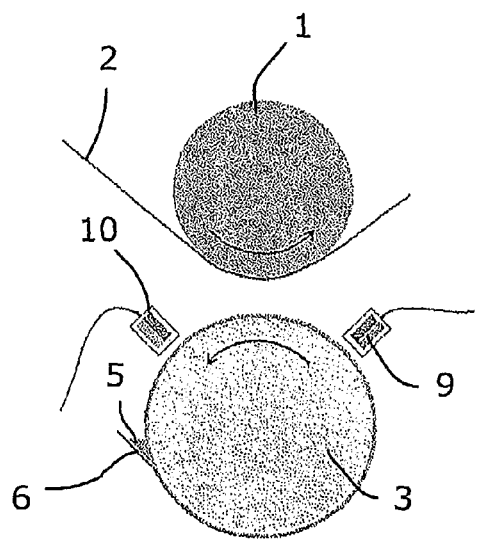
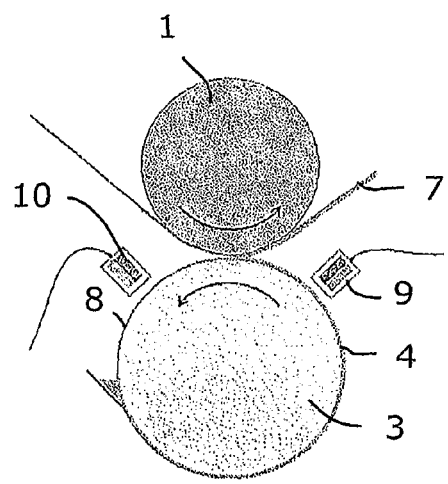
Fig. 1  Fig. 2
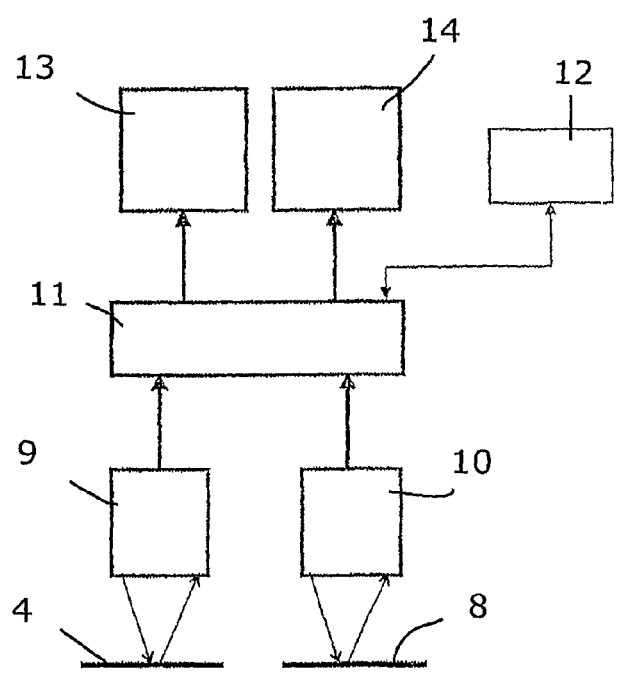
Fig. 3

SYSTEM AND METHOD FOR MEASURING THE THICKNESS OF A LAYER OF COATING

TECHNICAL FIELD

The present invention concerns a system for radiometric measuring of a coating on a substrate and a method for liquid film coating on a substrate comprising the step of measuring the coating thickness. The invention also concerns use of the system and the method.

The system of the present invention may for instance use the measuring principle described in WO 02/42077.

BACKGROUND OF THE INVENTION

It is known that different fluids, such as coatings, absorb different, specific bands of IR (infrared) radiation. This knowledge is used in radiometric measuring where absorption of radiation wavelengths within the IR area is used. The main or other absorption bands of a fluid to be measured is used in that the change of energy when the radiation passes through the film is analysed. An important condition for such a measurement is that the substrate on which the fluid is received reflects a major part of the radiation in the selected wavelength range. Thus, by directing IR radiation towards a film, such as a coating layer on a substrate it is possible to determine the thickness of the coating layer.

If the substrate receiving the coating has low reflection it may be difficult and in some cases even impossible to measure directly on the coating of the substrate. Also for substrates having an uneven surface or having surface with other considerable variations there may be problems with measuring directly on the coating of the substrate.

SUMMARY

In view of the above there is a need of a method of measuring of the thickness of a layer of coating in cases where it is not possible or problematic to measure directly on the layer of coating. Thus, such a method could be said to be a method of indirect measuring of the thickness of a layer of coating.

Even though radiometric measuring at a wavelength in the infrared spectrum is preferred at present, other sensor technology may also be used according to the broadest scope of the invention. Such other technologies may include sensors for "optic runtime measuring", detecting disturbances in the reflected light, or sensors for "ellipsometry", wherein the Brewster angle is used. However, none of these alternative sensor technologies have the same desired accuracy or simplicity.

By using IR radiometric sensor technology for measuring at one wavelength, a large surface may be measured and an average value calculated. The value obtained has a higher accuracy than measurements on a more limited surface, using the advantages of "optical averaging". Furthermore, the radiometric measurement method is very suitable for the measuring of thin layers such as coating solutions, sterilising solutions or adhesive layers. In fact, the accuracy and resolution of the obtained values is improved by this method and a more robust test method is obtained.

By radiometric measuring, the thinner the layer to be measured, the higher will the relative accuracy of the measurements be.

The invention concerns measuring of the thickness of a coating layer of a substrate. The invention is developed for substrates that do not have enough reflection for direct measuring or substrates that have surfaces with strongly differing appearance. Examples of such materials are paper and wood.

Measuring is done on a coating roller before and after that the coating has been given to the substrate. The measured difference in thickness is used to calculate the thickness of the coating on the substrate. The inventive measuring method may be used in any roller coating method, e.g. direct or reverse gravure methods, microgravure methods, a two-roll beat coat method, a bottom-feeding three-roll coat method, doctor knife methods etc. It may be used in the art of so-called dispersion coating or liquid film coating of functional layers, such as e.g. barrier layers or adhesive layers, but also in printing operations and in the application of a thin liquid film of a sterilising agent on a substrate to be sterilised. Such methods may also used in roller-coating of lacquer or varnish onto wooden boards for furnishing panels or flooring.

By the method of the invention, high accuracy in the measuring of coating thickness is achieved, while the method also affords a simple and quick calibration, compared to measuring directly on the substrate. Also, if the quality of the surface of the roller changes over time, this potential source of error in measurements is eliminated by the measuring before and after coating transfer to the substrate has taken place.

The result of the measuring may be used in different ways, for instance it is possible to display the current thickness of the coating and possibly amend the amount of coating manually. It is also possible to connect the sensors to a control unit of the machine increasing or decreasing the amount of coating automatically as needed. A third possibility is to set an alarm to warn if the thickness of the coating goes above or below set limit values. The system measuring the thickness of coatings may for example be used when manufacturing a laminated packaging material or when manufacturing wooden boards. The wooden boards may for instance be used for floors or ceilings.

Further objects and advantages of the present invention will be obvious to a person skilled in the art reading the detailed description below of different embodiments.

BRIEF DESCRIPTION OF THE DRAWINGS

The invention will be described further below by way of examples and with reference to the enclosed drawings. In the drawings:

FIG. 1 shows the set-up of a system for applying coating to a substrate in an inactive position, thus without applying any coating, FIG. 2 shows the system of FIG. 1 in an active position, FIG. 3 shows a block diagram illustrating one example of control of the system of FIGS. 1 and 2.

DETAILED DESCRIPTION OF EMBODIMENTS

Figure 4:
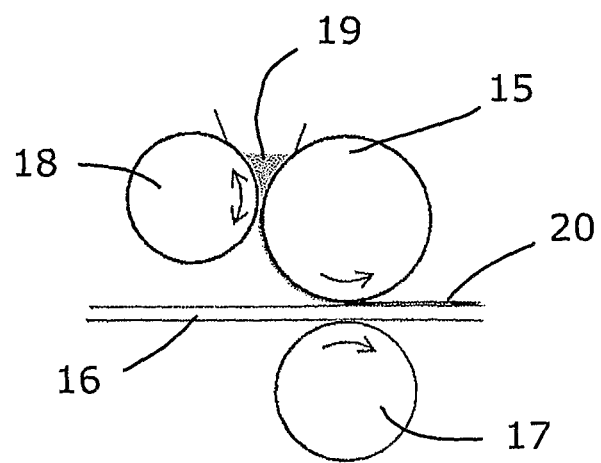
FIG. 4 shows an alternative set-up of a system for applying coating to a substrate.

In the FIGS. a set-up for measuring according to the present invention is indicated. The shown embodiment is only one example and a person skilled in the art realises that the exact form of the different parts may vary. For example the coating may be applied at a straight part of the substrate and not at a roller.

In the shown example a substrate 2 is fed over a roller 1. A coating roller 3 is placed opposite the roller 1 of the substrate 2. The coating roller 3 may have different embodiments, one embodiment being a so-called anilox roller. A layer 4 of coating is deposited on the coating roller 3. The coating is given to the coating roller 3 by means of a pocket 5 and a stripper 6. The pocket 5 is in practice the area between the stripper 6 and the coating roller 3, which area is constantly supplied with coating. The stripper 6 spreads the coating onto the surface of the coating roller 3, giving the layer 4 of coating. By altering the position and/or inclination of the stripper 6 it is possible to control the amount of coating delivered to the coating roller 3. Coating is given to the substrate 2 in that the substrate 2 is pressed against the coating roller 3. The roller 1 of the substrate 2 and the coating roller 3 rotate in opposite directions. In other embodiments the coating roller and the substrate move in the same direction at an area of contact. The rotating directions of the roller 1 of the substrate 2 and the coating roller 3 are indicated with arrows in FIGS. 1 and 2. A small amount of the coating will stick to the coating roller 3 and will not be deposited on the substrate 2. Said small amount forms a thin layer 8 of coating on the part of the coating roller 3 between the roller 1 of the substrate 2 and the reservoir 5, seen in the rotation direction of the coating roller 3.

Two sensors 9, 10 are directed to the coating roller 3. A first sensor 9 is directed to the coating roller 3 in an area between the reservoir 5 and the area where the substrate 2 is in contact with the coating roller 3, seen in the rotational direction of the coating roller 3. Thus, said first sensor 9 is directed to a relatively thick layer 4 of coating and before coating is deposited on the substrate 2. The second sensor 10 is directed to the area of the coating roller 3 placed between the roller 1 of the substrate 2 and the reservoir 5, seen in the rotational direction of the coating roller 3. Thus, the second sensor 10 is directed to a relatively thin layer 8 of coating.

Each sensor 9, 10 has one measuring channel giving the thickness value of respective layer 4, 8 of coating and a reference channel compensating for variations of the measuring system, the object to be measured and the measuring environment.

The sensors 9, 10 are preferably each a unit having an IR radiator and an IR detector. The IR light is sent more or less in parallel.

Before starting the actual measurements the sensors 9, 10 are calibrated on an empty coating roller 3, to adjust the force of the signal. The coating roller 3 must be reflective enough to give detectable signals also in coated state. The minimal force to be used is normally the force, which gives a full signal with an empty coating roller 3.

For substrates of paper, paperboard or the like the coating composition may comprise a solution or dispersion of a polymer providing barrier properties, such as for example PVOH (polyvinyl alcohol), starch, starch derivates, optionally in combination with an inorganic filler compound, preferably having a laminar shape, such as for example talcum or nanoparticles. The thickness of the coating when producing laminated packaging material is normally from 1-20 µm, preferably 1-10 µm and most preferred 2-5 µm. A person skilled in the art realises that the system may be used for any coating thicknesses, as long as the sensors can pick up detectable signals.

To start the measurements one or more characteristic absorption band for the coating used is first determined. The absorption bands are to be in the IR range. The determination of the one or more characteristic absorption bands of the coating is normally done by means of spectral analysis of the coating. Preferably the main absorption band of the coating is used, even though also other absorption bands of the coating may be used. Based on this information the IR detectors are set to receive radiation in a band around the chosen characteristic absorption band. The band is normally given by means of one or more filters placed on the IR detectors. The one or more filters may also be placed at the IR radiators. The IR radiators are often set to send IR light in a broad range. When the IR light is sent in a broad range the IR radiators normally do not have to be adjusted, any adjustments are done by changing the filters at the detectors or the radiators. It is also possible to use IR radiators sending IR light in a narrow range, which narrow range is adapted to the chosen characteristic absorption band.

In use the signals from the sensors 9 and 10 are processed to give the thickness of the thick layer 4 of coating and the thin layer 8 of coating, respectively, on the coating roller 3. The difference in thickness of respective layer 4, 8 may be used to calculate the amount of coating deposited on the substrate 2. If the amount of coating is known it is possible to calculate the thickness of the layer of coating 7 on the substrate. In order to make such a calculation the speeds of the coating roller 3 and substrate 2, respectively, must be known as well as the widths of the coating roller 3 and substrate 2, respectively. It may be necessary to use a factor to adapt the calculated value. Such an adaptation factor may be influenced of different features, such as possible spillage at the coating roller 3, possible spillage at the transfer, the absorbing quality of the substrate 2 in view of the coating used and possible evaporation of the coating.

In the example shown in FIG. 3 the signals from the sensors 9, 10 are forward to a control unit 11. Based on these signals and signals from a control unit 12 of the machine the thickness of the layers 4, 8 of coating are calculated. The control unit 12 of the machine gives the rotational speeds of the rollers 1, 3. In other embodiments the functions of the two control units 11, 12 are combined into one single control unit. If the calculation shows that either more or less coating should be transferred to the substrate 2, the control unit 11 sends a signal to the control unit 12 of the machine to regulate the machine so that more or less coating is transferred. The amount of coating deposited on the substrate may be regulated by controlling the speed of the coating roller 3 and/or the roller 1 of the substrate 2. It is also possible to amend the position and/or inclination of the stripper 6 to control the amount of coating deposited on the coating roller. Signals may also be sent to a display 13 showing the actual thickness of the layer 7 of coating of the substrate 2. A further possibility is that signals are sent to some kind of alarm 14, using light, sound etc. to warn if the thickness of the layer 7 of coating on the substrate 2 goes above or below set limits. Depending on setting the measuring system may have only one, two or all of the different options above. Thus, the measuring system may send signals to the control unit 12 of the machine, to the display 13 and/or to the alarm 14. Normally, the control unit 11 has means to record the results of the measuring and also record the different settings. The means of recording the measuring and the settings is normally a memory. It is thereby possible to afterwards check and analyse the course of events and possible disturbances.

The settings of the IR radiators of the sensors 9, 10 are either controlled by the general control unit 11 or by a separate control unit in each sensor 9, 10.

The coating may be delivered in many different ways to the coating roller. Examples of different methods are metering rollers, sprayer units and liquid baths. In FIG. 4 one example of a method of deliverance of coating is shown. A coating roller 15 deposits a layer 20 of coating on a substrate 16. The coating roller 15 is placed opposite a roller 17 of the substrate 16. In the shown example the coating roller 15 and the roller of the substrate 16 rotates in the same direction, thus, the coating roller 15 and the substrate 16 move in the same direction. The coating is deposited on the coating roller 15 by means of a doctor roller 18 and a pocket 19 formed between the doctor roller 18 and the coating roller 15. The formed pocket 19 is kept filled with coating.

The invention claimed is:

1. A system for measuring and adjusting the thickness of a layer of coating deposited on a substrate, wherein the thickness is measured indirectly by measuring on a coating roller before and after the coating has been deposited on the substrate, the system comprising:
   a first control unit for calculating the thickness of the layer of coating deposited on the substrate;
   a second control unit for generating signals which indicate respective speeds of the substrate and the coating roller;
   a first sensor directed to an area of the coating roller between a position where coating is transferred to the coating roller and a position where coating is transferred from the coating roller to the substrate, seen in the rotational direction of the coating roller;
   a second sensor directed to an area of the coating roller between a position where coating is transferred from the coating roller to the substrate and a position where coating is transferred to the coating roller, seen in the rotational direction of the coating roller;
   wherein the first and second sensors generate respective signals relating to the thickness of a layer of coating on the coating roller at the respective areas of the coating roller to which the first and second sensors are directed;
   wherein the first control unit calculates the thickness of the deposited layer based on the signals generated by the first and second sensors and by the second control unit and adjusts the thickness of the deposited layer by adjusting the speed of one or more of the coating roller and the substrate.

2. The system of claim 1, wherein the sensors are units having IR radiators and IR detectors, wherein each sensor has one measuring channel and one reference channel that uses the same wavelength as the measuring channel, compensating for variations of the measuring system, the object to be measured and the measuring environment and wherein the sensors are adapted to a characteristic absorption band of the coating.

3. The system of claim 1, wherein an adaptation factor is used in the calculation of the thickness of the layer of coating on the substrate, which adaptation factor is based on further features having an influence of the thickness of the layer of coating on the substrate, which features include one or more of spillage at the coating roller, spillage at the transfer of coating from the coating roller to the substrate and the absorption quality of the substrate for the coating.

4. The system of claim 1, wherein the first control unit sends signals to a display, showing the calculated thickness of the layer of coating on the substrate and/or wherein the first control unit sends signals to an alarm when the calculated thickness of the layer of coating on the substrate is above or below set limit values of the thickness of the layer of coating on the substrate.

5. Use of the system for measuring the thickness of a layer of coating deposited on a substrate according to claim 1 in manufacturing a laminated packaging material.

6. The use of claim 5, wherein the thickness of the coating is from 1-20 µm.

7. The use of claim 5, wherein the thickness of the coating is from 1-10 µm.

8. The use of claim 5, wherein the thickness of the coating is from 2-5 µm.

9. Use of the system according to claim 1, for measuring the thickness of a coated thin liquid layer of sterilising agent deposited on a surface of a packaging material in manufacturing of packaging containers from the packaging material in a filling and packaging machine.

10. Use of the system for measuring the thickness of a layer of coating deposited on a substrate according to claim 1 in manufacturing a coated wooden board.

11. A method for measuring and adjusting the thickness of a layer of coating deposited on a substrate, wherein the thickness is measured indirectly by measuring on a coating roller before and after the coating has been deposited on the substrate, the method comprising:
   generating signals which indicate respective speeds of the substrate and the coating roller;
   generating a signal relating to the thickness of a layer of coating on an area of the coating roller between a position where coating is transferred to the coating roller and a position where coating is transferred from the coating roller to the substrate, seen in the rotational direction of the coating roller;
   generating a signal relating to the thickness of a layer of coating on an area of the coating roller between a position where coating is transferred from the coating roller to the substrate and a position where coating is transferred to the coating roller, seen in the rotational direction of the coating roller;
   calculating the thickness of the layer of coating deposited on the substrate based on the generated signals; and
   adjusting the thickness of the deposited layer by adjusting the speed of one or more of the coating roller and the substrate.

12. The method of claim 11, wherein the thickness is measured by means of IR radiometric measurement, using at least two sensor units having IR radiators and IR detectors, wherein the sensor units are calibrated on the coating roller without any coating, and wherein each sensor unit has one measuring channel and one reference channel that uses the same wavelength as the measuring channel.

13. The method of claim 11, wherein the coating is applied by means of a liquid film coating method.

14. The method of claim 11, wherein the coating composition comprises a solution or dispersion of a polymer, such as PVOH, starch, starch derivates, optionally in combination with an inorganic filler compound, preferably having a laminar shape, such as for example talcum, or nanoparticles.

15. The method of claim 11, wherein the substrate is paper or carton.

16. The method of claim 11, wherein the coating is a sterilising agent applied to a substrate to be sterilised.

17. Use of the method for measuring the thickness of a layer of coating deposited on a substrate according to claim 11 in manufacturing a laminated packaging material.

18. Use of the method according to claim 11 for measuring the thickness of a coated thin liquid layer of sterilising agent deposited on a surface of a packaging material in manufacturing of packaging containers from the packaging material in a filling and packaging machine.

19. Use of the method for measuring the thickness of a layer of coating deposited on a substrate according to claim 11 in manufacturing a coated wooden board.

20. The method of claim 11, wherein an adaptation factor is used in the calculation of the thickness of the layer of coating on the substrate, which adaptation factor is based on further features having an influence of the thickness of the layer of coating on the substrate, which features include one or more of spillage at the coating roller, spillage at the transfer of coating from the coating roller to the substrate and the absorption quality of the substrate for the coating.

* * * * *